April 8, 1930.　　　W. NICHOLAS　　　1,753,299
RUBBER TUBE TRIMMING MACHINE
Original Filed July 18, 1923　　2 Sheets-Sheet 1
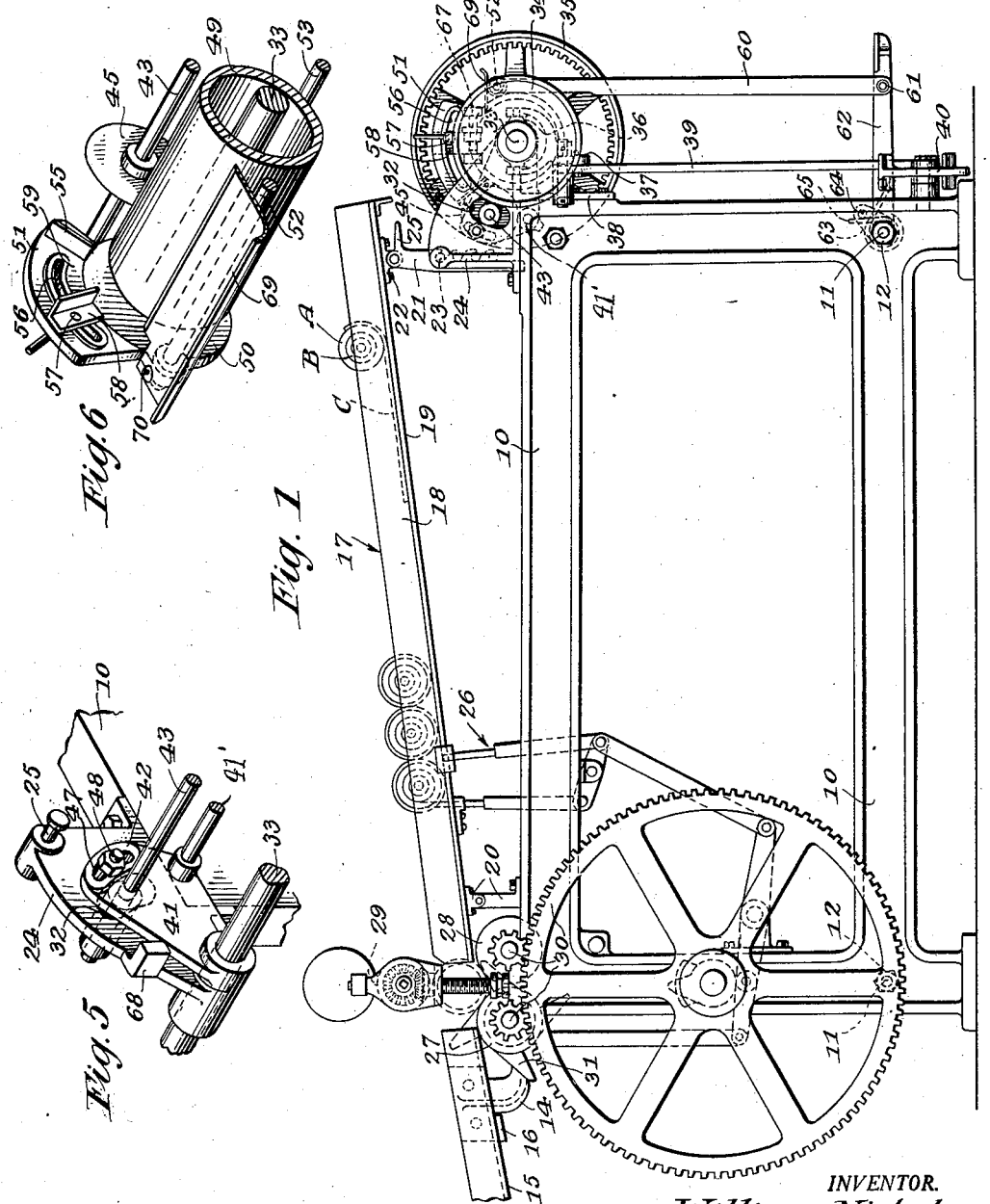
INVENTOR.
William Nicholas
BY
ATTORNEYS.

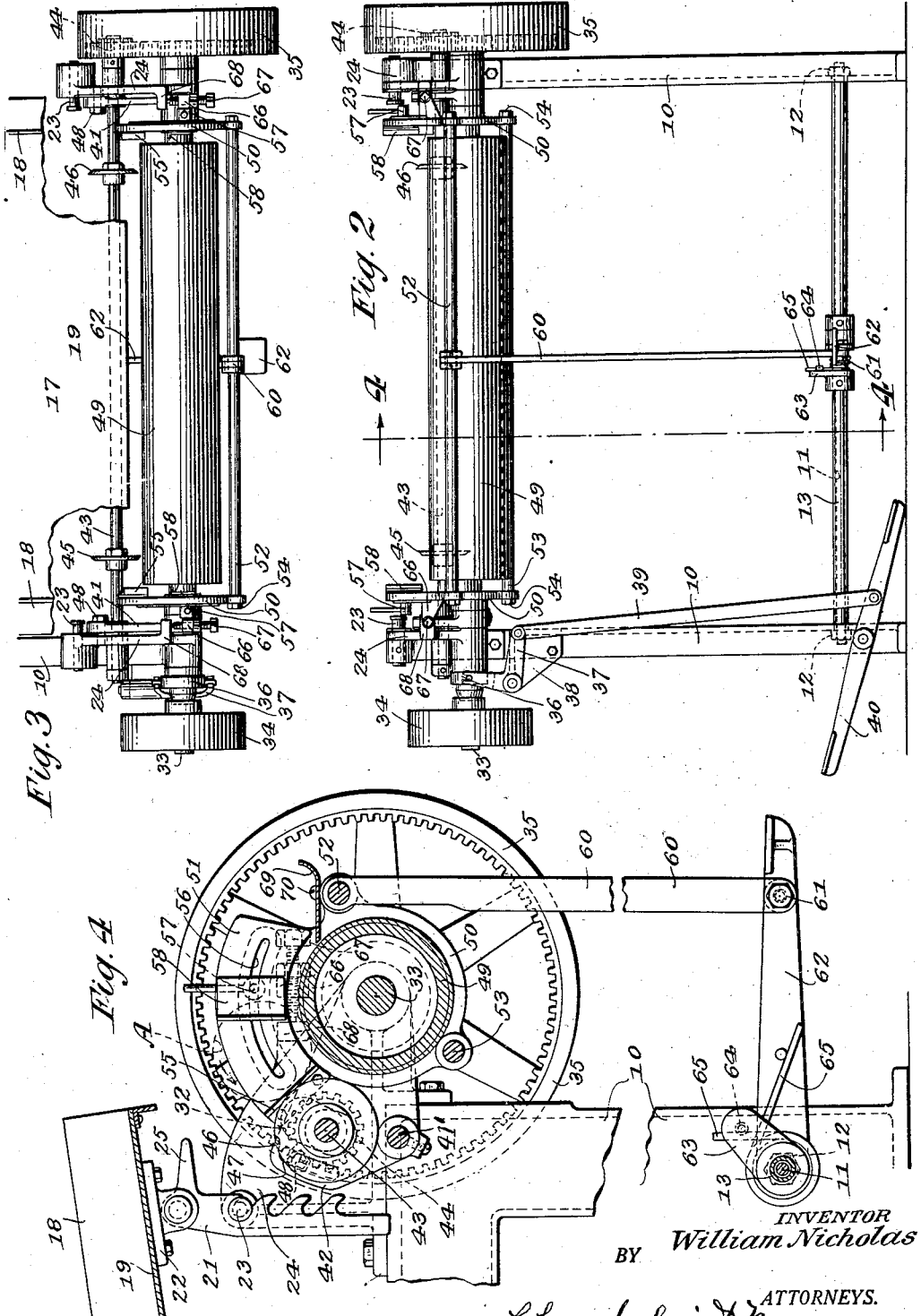

Patented Apr. 8, 1930

1,753,299

UNITED STATES PATENT OFFICE

WILLIAM NICHOLAS, OF BRIDGEPORT, CONNECTICUT, ASSIGNOR TO THE BLACK ROCK MANUFACTURING COMPANY, OF BRIDGEPORT, CONNECTICUT, A CORPORATION OF CONNECTICUT

RUBBER-TUBE-TRIMMING MACHINE

Original application filed July 18, 1923, Serial No. 652,267. Divided and this application filed June 5, 1925. Serial No. 35,144.

This invention relates to trimming machines, particularly for trimming the ends of uncured rubber tubes, prior to subsequent wrapping, rolling and vulcanizing treatments, and is a division of my co-pending application for "Rubber tube trimming, wrapping and rolling machines," Ser. No. 652,267, filed July 18, 1923.

In the art of making rubber jar rings, and other circular pieces and rubber bands, it is first necessary to form relatively long rubber tubes, which are made on other types of rubber machines, such as extruding machines that serve to form plastic rubber stock into tubes, which are formed and supported on mandrels. These tubes are obviously formed of various sizes and lengths, according to the particular class of rings to be cut therefrom.

The object of the invention therefore is to provide a machine which is adapted to trim off the uneven end portions of these roughly formed tubes, while supported upon mandrels.

A further object is to provide adjustable cutters, whereby tubes of different diameters and lengths may be trimmed and whereby all tubes of a like kind can be cut exactly the same length.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification and in which:

Fig. 1 is a side elevation of a trimming, wrapping and rolling machine, embodying present invention, a portion of one end being broken away;

Fig. 2 is a front elevation of the machine, showing the trimming mechanism;

Fig. 3 is a plan view of the front end of the machine, as seen in Fig. 2;

Fig. 4 is an enlarged cross sectional view of the front end of the machine, taken on line 4—4 of Fig. 2;

Fig. 5 is a perspective view of the supporting bracket and adjustably attached member for carrying the cutter shaft, and;

Fig. 6 is a perspective view of one end portion of rockable holder for rubber tubes to be cut.

Referring to the drawings, and more particularly to Fig. 1, the main frame of the machine consists of side members 10—10 tied together in spaced relation by means of fixed tie rods 11 having nuts 12 on their outer threaded ends that serve to clamp both of said side members against the end of tubes 13, through which the rods extend.

Brackets 14—14 are secured to the rear end of the side member 10—10 and support a downwardly inclined runway consisting of side angle bars 15—15 connected by transverse cross strips 16.

An inclined table 17 is adjustably mounted upon the frame 10 so as to be given more or less pitch from front to rear and to insure the rolling of the rolls away from the operator when released. This table includes two side flanges consisting of angle bars 18—18 adjustably secured to the side frame members 10 as will later be explained. A sheet metal flooring 19 is secured upon these side bars to form a bed upon which the fabric C is laid for rolling upon the tube A. The inner end of the table is hingedly supported in spaced relation to the frame 10 through brackets 20 one of which is secured to the table and the other to the frame. The front and higher end of the table is vertically adjustably mounted upon the frame by means of a toothed supporting member 21 pivotally connected to a bracket 22 secured to the under side of the angle bar 18. This support includes a series of notches one of which is designed to engage a pin 23 on a bearing bracket 24 secured to the frame. This pivotal support is provided with a handle 25 by means of which the same may be swung upon its pivot as in the adjustment of the same with reference to the pin and post.

At the front end of the table the trimming mechanism, forming the subject matter of the present invention, is mounted, the trimmed tubes A mounted on tubular mandrels B being placed upon the inclined table after trimming and then rolled in a wrapping layer C of wet canvas, or other suitable material. A number of the wrapped tubes are held upon the table by intermittently operating mechanism 26, which serves to periodically release one of the wrapped tubes, which rolls into relation with the rolls 27, 28 and 29 driven by a train of gearing 30, the rolls 27 and 28 being supporting rolls, while the roll 29, which is suitably weighted, is a pressure roll. The rolling mechanism serves to impart a uniform structure to the tubes, so that the same are of equal thickness throughout their circumference, and air pockets and irregular porosity are subjected to a uniforming action, the tubes being then ready for further vulcanizing treatments. After a predetermined rolling, the tubes are removed from between the rolls and deposited on the inclined runway 15 by means of a removal mechanism 31, adapted to be periodically actuated in cooperation with the releasing mechanism.

The releasing, rolling and removal mechanisms per se do not form a part of the present invention, being covered in my co-pending application Ser. No. 652,267, and therefore a more detailed description of the same is not deemed necessary to the present description.

At the front upper corners of the side frame members 10—10 there are secured the before mentioned bearing brackets 24 in each of which is formed a slot 32. A main shaft 33 is journaled in these brackets and is provided at one end with a pulley 34 and at its other end with a combined pulley and internal gear 35. This driving pulley 34 may be continuously driven and connected or disconnected with the shaft 33 by a clutch 36, adapted to be operated by a bell crank 37 pivotally mounted upon a bracket 38 supported upon the side frame, and connected to a rod 39 with a foot pedal 40 pivotably mounted upon the lower portion of one of the side frames 10.

Adjacent the inner sides of the brackets 24—24 a pair of rotatably adjustable members 41 are mounted upon the shaft 33, and have journaled in their radially extending bearing portions 42, a cutter shaft 43 provided at one end with a pinion 44 meshing with the internal gear 35, and in spaced relation between the members 41 with a pair of circular cutting knives 45 and 46. These adjustable members are tied together and held in their relative positions by means of a tie-rod 41' which extends through from one member to the other and is positioned substantially beneath the cutter shaft 43. The members 41 are furthermore provided with arcuate slots 47 respectively engaged by a set screw 48 secured in the brackets 24—24, adapted by tightening against the sides of the slotted portions of said members to fix them in their adjusted relation. This construction enables the cutting knives to be adjusted circumferentially about the shaft 33.

A cylindrical roll 49 is mounted upon the shaft 33 to rotate therewith, and between its ends and the adjustable members 41 there are mounted upon the shaft a pair of rotatable work carriers including hub portions 50 and segmental radially projecting portions 51, having a pair of tie rods 52 and 53 extending between them and connected at their ends to said portions 50 by pairs of nuts 54 engaging the threaded ends of the rods. An inwardly extending flange 55 is fixed upon the projecting portions 51 adjacent to the circumferential slots 56, and in these slots are mounted set screws 57, the threaded ends of which engage an adjustable block 58 for securing the block upon said portions so as to be movable toward and away from the flanges 55 and providing radial pockets 59 at the inner sides of the members. The pockets 59 are adapted to receive the ends of the mandrel B upon which the rubber tubes A are mounted, the latter resting upon the roll 49, so that it is rotated thereby, and may be moved through rotation of the work carrier members into and out of relation to the rotating cutter knives, so that the ends of the tube will be trimmed thereby. The adjustability of the pockets as to width permits different sized mandrels to be inserted therein, the knives being also circumferentially adjustable toward and away from the mandrel, as before pointed out.

The movement of the mandrels and the tube thereon into and out of relation with the cutting knives is brought about by foot-operated mechanism. The tie rod 52 has connected at its center the upper end of a rod 60, the lower end of which is pivotally connected at 61 to a foot lever 62 pivoted to tube 13. An arm 63 is secured to this tube and carries a pin 64 against which bears one end of a spring 65 coiled upon the tube and whose other end engages a pin of the foot lever. This spring serves to move the mandrel into engagement with the cutting knives and to hold the tube A yieldingly in engagement therewith during the cutting operation. I have also provided adjustable stops, which I will now describe, to limit the movement of the rolls and mandrels toward the rotary knives and whereby rubber rolls of different sizes and thickness may be cut through to the mandrels and without danger of the edge of the knives engaging the mandrels.

A lug 66 is formed upon the outer side of each of the adjustable members 51 and carries an adjustable screw 67 whose end abuts against an arm 68 formed upon the bearing bracket 24. By adjustment of the screw the depth of the cut of the knives may be regulated as desired. When it is desired to remove one of the mandrels and place another in position, the operator depresses the foot lever 62, thereby moving the work carrier and the mandrel supported thereby against the action of the spring 65 away from the cutting knives. The mandrel with the trimmed tube thereon is then placed upon the inclined table, which serves as a work table upon which the cloth covering is started upon the rubber tubes by hand and finished by rolling down the table by gravity. A sheet metal plate 69 is attached to the hub portions 50 by means of screws 70 and is further supported intermediate its length on rod 52, and serves to form a table upon which a roll to be wrapped, is positioned preparatory to being placed in the radial pockets 59.

While I have illustrated and described the invention with reference to the trimming of the ends of rubber tubes to be used for a certain purpose, it will be understood that the same is not limited to such use.

Having thus described my invention, what I claim and desire to secure by Letters Patent is:—

1. In a trimming machine, means for trimming the ends of rubber tubes or the like upon mandrels, and including a pair of cutting knives, a rotatable cylindrical support adapted to support and rotate said tubes in epicyclic rolling contact therewith, means adapted to support the ends of said mandrels, and having adjustable means adapted to receive different sized mandrels, and means for moving said supporting means about the axis of said roll to move said tubes into and out of relation with said cutting knives.

2. In a trimming machine, means for trimming the ends of rubber tubes or the like, and including a pair of cutting knives, a rotatable roll adapted to support and rotate said tubes in opposed direction to itself, spring means adapted to yieldably press said tubes into relation with said knives, and foot-operated means for moving said tubes out of relation with said cutting knives.

3. In a trimming machine, means for trimming the ends of rubber tubes or the like upon mandrels, and including a pair of cutting knives, a rotatable cylindrical roll adapted to support and rotate said tubes in epicyclic rolling contact therewith, means adapted to support the ends of said mandrels and including means whereby different sized mandrels may be supported therein, and means for moving said supporting means about the axis of said roll to move the tubes into and out of relation with said cutting knives.

4. In a trimming machine, means for trimming the ends of rubber tubes or the like upon mandrels, and including a pair of cutting knives, a rotatable cylindrical roll adapted to support and rotate said tubes in epicyclic rolling contact therewith, means adapted to support the ends of said mandrels and including slots for receiving said mandrel ends radially disposed with respect to the axis of said roll and having parallel side walls, an adjustably mounted member constituting one of said side walls and whereby the width of the slots may be adjusted to different sized mandrels, and means for moving said supporting means about the axis of said roll to move the tubes into and out of relation with said cutting knives.

5. In a trimming machine, the combination with a frame, an elongated cylindrical operating roll mounted thereon, means to position mandrils of various diameters having a rubber tube sleeved thereon to rest on said roll, whereby various sizes of rubber tubes or the like may be supported in epicyclic rolling contact on the roll, a pair of spaced apart circular cutting knives positioned to engage with the rotated rubber tube when positioned upon the operating roll in a manner to trim off the end portions of the tube, and means adapted to rotate said knives in opposed direction to the direction of rotation of the rubber tube.

6. In a trimming machine, the combination with a frame, an elongated cylindrical operating roll carried by the frame, means to position mandrils of various diameters having a rubber tube sleeved thereon to rest on said roll, whereby various sizes of rubber tubes or the like may be supported in epicyclic rolling contact on the roll in opposed direction to said roll, a cutting knife positioned adjacent to each end portion of the operating roll to engage the end portions of a rubber tube when rotatably mounted upon the roll, means for rotating the knives, and adjustable means adapted to regulate the depth of the cut of the knives.

7. In a trimming machine, the combination with a frame, an elongated cylindrical operating roll mounted thereon, means to position mandrils of various diameters having a rubber tube sleeved thereon to rest on said roll, whereby various sizes of rubber tubes or the like may be supported in epicyclic rolling contact on the roll, cutting knives positioned adjacent to each end portion of the operating roll to engage the end portions of a rubber tube when mounted thereon, and carrier means adjacent the ends of the operating roll adapted to receive the ends of a mandrel upon which the tube is mounted, and means for moving said carrier means with respect to the cutting knives.

8. In a trimming machine means for trimming the ends of various sized rubber tubes or the like, and including rotary cutting knives, means for rotating said knives, and means adapted to rotate said tubes in relation to said knives to trim their ends, comprising an elongated cylindrical roll adapted to roll said tube around its circumference in opposed direction and in epicyclic rolling contact therewith.

9. In a trimming machine, means for trimming the ends of various sized rubber tubes or the like, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll, and means adapted to move said tubes circumferentially about said roll into and out of relation with said cutting knives.

10. In a trimming machine, means for trimming the ends of rubber tubes or the like upon mandrels, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll, means adapted to support the ends of said mandrels, and means for moving said supporting means about the axis of said roll to move the tubes into and out of relation with said cutting knives.

11. In a trimming machine, means for trimming the ends of rubber tubes or the like, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll in opposed direction thereto, means adapted to yieldably press said tubes into relation with said knives, and means for moving said tubes out of relation with said knives.

12. In a trimming machine, means for trimming the ends of rubber tubes or the like, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll in opposed direction thereto, means adapted to yieldably press said tubes into relation with said knives, adjustable means adapted to limit the degree of engagement of said tubes with said knives, and means for moving said tubes out of relation with said knives.

13. In a trimming machine, means for trimming the ends of rubber tubes or the like, and including circular cutting knives, an elongated cylindrical roll, means to position mandrils of varying diameters having a rubber tube sleeved thereon to rest on said roll, whereby various sizes of rubber tubes or the like may be supported in epicyclic rolling contact on the roll in opposed direction thereto, gearing between said roll and said shaft adapted to rotate said knives, and means for moving said tubes into and out of relation with said knives.

14. In a trimming machine, means for trimming the ends of rubber tubes or the like, and including circular cutting knives, a shaft supporting said knives and having a pinion at one end, a rotatable cylindrical roll, means to position mandrils of varying diameters having a rubber tube sleeved thereon to rest on said roll, whereby various sizes of rubber tubes or the like may be supported in epicyclic rolling contact on the roll in opposed direction thereto, a gear at one end of said roll meshing with said pinion, and adapted to rotate said knives, and means for moving said tubes into and out of relation with said knives.

15. In a trimming machine, means for trimming the ends of rubber tubes or the like, and including circular cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll, a shaft mounting said roll, supporting means for said circular knives rotatably mounted on said roll shaft, means for adjustably fixing the angular position of said knives circumferentially of said roll, and means for moving said tubes into and out of relation with said knives.

16. In a trimming machine, means for trimming the ends of rubber tubes or the like upon mandrels, and including circular cutting knives, a shaft supporting said knives, a rotatable elongated cylindrical roll, means to position mandrils of varying diameters having a rubber tube sleeved thereon to rest on said roll, whereby various sizes of rubber tubes or the like may be supported in epicyclic rolling contact on the roll, a shaft mounting said roll, supports for said knife supporting shaft at the ends of said roll, and rotatably mountd on said roll shaft, means for adjustably fixing the angular position of said knives circumferentially of said roll, means adapted to support the ends of said mandrels, and comprising carriers at each end of said roll rotatably mounted on said roll shaft, and means for moving said carriers to move said tubes into and out of relation with said knives.

17. In a trimming machine, means for trimming the ends of rubber tubes or the like upon mandrels, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll, means adapted to support the ends of said mandrels and including slots for receiving said mandrel ends radially disposed with respect to the axis of said roll, and means for moving said supporting means about the axis of said roll to move the tubes into and out of relation with said cutting knives.

18. In a trimming machine, means for trimming the ends of rubber tubes or the like upon mandrels, and including a pair of cutting knives, a rotatable cylindrical roll, means to position mandrils of varying diameters having a rubber tube sleeved thereon to rest on said roll, whereby various sizes of rubber tubes or the like may be supported in epicyclic rolling contact on the roll, means adapted to support the ends of said mandrels and including slots for receiving said mandrel ends radially disposed with respect to the axis of said roll and having parallel side walls, and means for moving said supporting means about the axis of said roll to move the tubes into and out of relation with said cutting knives.

19. In a trimming machine, means for trimming the ends of rubber tubes or the like and including rotary cutting knives, means for rotating said knives, and means adapted to rotate said tubes in relation to said knives to trim their ends and in a direction of rotation opposed to the direction of rotation of said knives, comprising an elongated cylindrical roll adapted to roll said tube around its circumference in opposed direction and in epicyclic rolling contact therewith.

20. In a trimming machine, means for trimming the ends of rubber tubes or the like, and including rotary cutting knives, means for rotating said knives, and means adapted to rotate said tubes in relation to said knives to trim their ends and in a direction of rotation opposed to the direction of rotation of said knives, comprising an elongated cylindrical roll, means to position mandrils of varying diameters having a rubber tube sleeved thereon to rest on said roll, whereby various sized rubber tubes or the like may be supported in epicyclic rolling contact on the roll, the edges of said knives and the surface of said tubes moving downwardly with respect to each other.

Signed at Bridgeport, in the county of Fairfield and State of Connecticut, this 20th day of April A. D. 1925.

WILLIAM NICHOLAS.